(12) United States Patent
Boulkertous

(10) Patent No.: US 6,177,378 B1
(45) Date of Patent: Jan. 23, 2001

(54) PEROXIDE-CONTAINING CATALYST COMPOSITIONS AND THE USE THEREOF IN THE PULTRUSION PROCESS

(75) Inventor: Nabil Boulkertous, Günzburg (DE)

(73) Assignee: Elf Atochem Deutschland GmbH, Dusseldorf (DE)

( * ) Notice: Under 35 U.S.C. 154(b), the term of this patent shall be extended for 0 days.

(21) Appl. No.: 09/063,078

(22) Filed: Apr. 21, 1998

(30) Foreign Application Priority Data

Apr. 26, 1997 (DE) .............................................. 197 17 831

(51) Int. Cl.⁷ ...................................................... B01S 31/00
(52) U.S. Cl. ............................................. 502/160; 502/172
(58) Field of Search ..................................... 502/160, 172

(56) References Cited

U.S. PATENT DOCUMENTS

| | | |
|---|---|---|
| 4,299,718 | 11/1981 | Conti et al. . |
| 5,369,197 | 11/1994 | Torenbeek et al. . |
| 5,614,299 | 3/1997 | Yamamoto et al. . |

FOREIGN PATENT DOCUMENTS

| | | | |
|---|---|---|---|
| 29 52 667 | 7/1980 | (DE) . | |
| 915625 | * 1/1963 | (GB) | ..................................... 502/160 |
| 45-25513 | * 8/1970 | (JP) | ..................................... 502/160 |
| WO 94/09049 | 4/1994 | (WO) . | |

OTHER PUBLICATIONS

Michaeli, Walter. "Einfuhrung in die Kunststoff Verarbeitung", Carl Hansen Verlag, 1992, p. 150. (Translation) No Month Available.

Nol Groenendaal, "The Pultrusion Process, Selection Criteria for the Cure System" from the Conference of the European Pultrusion Technology Association, London. 1996 No Month Available.

* cited by examiner

Primary Examiner—Mark L. Bell
Assistant Examiner—J. Pasterczyk
(74) Attorney, Agent, or Firm—Merchant & Gould P.C.

(57) ABSTRACT

This invention relates to a peroxide-containing catalyst composition which contains 60 to 80% by weight of a ketone peroxide component (A), 10 to 20% by weight of a ketone ester component (B) and 10 to 20% by weight of an inhibitor component (C), wherein the sum of the percentages by weight of components (A), (B) and (C) adds up to 100% by weight. The invention also relates to the use of the peroxide-containing catalyst composition as a starter peroxide composition in the pultrusion process.

10 Claims, No Drawings

PEROXIDE-CONTAINING CATALYST COMPOSITIONS AND THE USE THEREOF IN THE PULTRUSION PROCESS

This invention relates to peroxide-containing catalyst compositions and to the use thereof as starter peroxide compositions in the pultrusion process.

Fibre-reinforced continuous plastics sections can be produced by the pultrusion process. In the course of this process, pre-dried fibre rovings are impregnated in a resin bath and are subsequently brought into the desired sectional shape by means of a heated extrusion die tool. The resin crosslinks due to the heat supplied. On the one hand the die used in this process should be as short as possible due to the high frictional forces which occur, and on the other hand the resin has to crosslink to an extent such that the emerging section remains stable in the following pull-off device (Michaeli, W.: "Einfuhrung in die Kunststoff Verarbeitung", Carl Hansen Verlag 1992, page 150). In other words, it has to be ensured that the gel formation time in the front part of the die is as short as possible, in order thus to prolong the curing phase until the product leaves the die. The latter requirement imposes stringent demands on the temperature-sensitive peroxides or peroxide mixtures, which are dissolved in the resin bath and which determine the course of the crosslinking process, and which thus also determine the quality of the fibre-reinforced final products.

A review of peroxides which have hitherto been used in the pultrusion process is given in the Akzo Nobel publication entitled "The Pultrusion Process, selection criteria for the cure system" (presented to the Conference of the European Pultusion Technology Association, London, 1996). A distinction is made in this publication between highly reactive starter peroxides (which act in the front die region) and into peroxides of lesser reactivity, which are responsible for the final curing.

The present invention relates to the former, i.e. to starter peroxide compositions. The prior art which is relevant thereto is therefore acknowledged below.

The Akzo Nobel publication describes the starter peroxides which determine the prior art, namely bis(4-tert.-butyl-cyclohexyl)-peroxydicarbonate and a methyl isobutyl ketone formulation. Bis(4-tert.-butyl-cyclohexyl)-peroxydicarbonate is normally used in the pultrusion process. This has a peroxide content of 95% by weight, but is only obtainable in solid form and is scarcely soluble in unsaturated polyester resins such as those which are used in the pultrusion process. The peroxydicarbonate therefore has to be dissolved in styrene if unwanted bubble formation in the resin is to be prevented; this comprises an additional operation. If bis(4-tert.-butyl-cyclohexyl)-peroxydicarbonate is stored in styrene, its stability on storage decreases due to thermal polymerisation. Moreover, bis(4-tert.-butyl-cyclohexyl)-peroxydicarbonate is only stable up to 20° C. during storage and transport, i.e. sufficient cooling must be ensured, particularly in hotter regions or in the hotter months of the year. The average pot life of resin compositions which contain bis(4-tert.-butyl-cyclohexyl)-peroxydicarbonate is two days, wherein the average pot life constitutes the period from stirring in the peroxide until the time at which the batch is still capable of being processed.

The second starter peroxide described in the Akzo Nobel publication is commercially available in the form of a methyl isobutyl ketone peroxide formulation with a peroxide content of 45% by weight. Compared with bis(4-tert.-butyl-cyclohexyl)-peroxydicarbonate, this has the advantage of existing in liquid form and is also stable on storage at 25° C. Despite this, the relevance of this formulation to production technology is slight, since the pot lives only range from 6 to 9 hours, due to which the processability of the resin-peroxide composition is severely limited with respect to time and the amount thereof The object of the present invention was to provide a peroxide composition which eliminates the aforementioned disadvantages of the products which have been used hitherto as a starter peroxide, and which in particular is soluble as a liquid formulation in unsaturated polyester resins, has a higher stability during storage and transport, and ensures long pot lives, without the quality of the final products thereby being impaired.

Surprisingly, this object is achieved by a peroxide-containing catalyst composition which comprises 60 to 80% by weight of a ketone peroxide component (A),
10 to 20% by weight of a ketone ester component (B) and
10 to 20% by weight of an inhibitor component (C),
wherein component (A) behaves in an inert maimer in relation to component (B) and the sum of the proportions by weight of components (A), (B) and (C) is 100% by weight.

The proportion by weight of component (A) is preferably 65 to 75% by weight, the proportion of component (B) is preferably 12.5 to 17.5% by weight and the proportion of component (C) is preferably 12.5 to 17.5% by weight, wherein the sum of the proportions by weight of components (A), (B) and (C) is 100% by weight Ketone peroxide component (A) in turn consists of 40 to 60% by weight of one or more monomeric ketone peroxides or of a mixture of monomeric and dimeric ketone peroxides, 15 to 40% by weight of a plasticizer, 1 to 10% by weight of a β-hydroxyketone, 1 to 5% by weight of hydrogen peroxide, 1 to 10% by weight of water and 5 to 15% by weight of a ketone, wherein the sum of these components is 100% by weight.

Methyl isobutyl ketone peroxide, methyl ethyl ketone peroxide, acetylacetone peroxide or cyclohexanone peroxide can be used as ketone peroxides, for example, wherein methyl isobutyl ketone peroxide is preferred. The peroxides generally exist in their monomeric form, but contain subsidiary proportions of dimers. Methyl isobutyl ketone peroxide, which is preferred, can even be used in the pultrusion process at 60° C. without the addition of accelerators in the polyester resin, whilst methyl ethyl ketone peroxide, acetylacetone peroxide and cyclohexanone peroxide can normally only be used above 80° C. However, under the same conditions as those for the use of methyl isobutyl ketone, new applications are opened up where extremely long pot lives are desirable. In some cases the pot life can be prolonged 10-fold (see Table 2 also).

All commercially available plasticizers can be used as plasticizers. In this respect, phthalic acid esters are preferred and dimethyl phthalate is particularly preferred.

Ketoester component (B) primarily serves as a solvent for the ketone peroxides and inhibitors. There are in fact diverse solvents for inhibitors, but these are often unsuitable for dissolving ketone peroxides. Ketoesters have proved suitable. The choice thereof is critical, however, since some ketoesters tend to react with ketone peroxides. Thus, for example, acetoacetic ester is only of limited suitability for the dissolution of acetylacetone peroxide, but has a high reactivity towards the other ketone peroxides according to the invention, i.e. a considerable decrease in active oxygen results (see Table 2). A reactivity of this kind is unacceptable for safety reasons alone. A preliminary choice of ketoester component can be made by means of the "iron(III) chloride test", for example. If an iron(III) enolate is formed, the tested ketoester component is generally unsuitable in the composition according to the invention. Therefore, the only ketoesters which can be used as ketoester component (B) are those which do not react with ketone peroxide component (A). The use of levulinic acid n-butyl ester, which exhibits inert behaviour towards all the ketone peroxides tested, is preferred in this respect.

The function of inhibitor component (C) is to prolong the pot life of the resin composition by capturing peroxide radicals which are formed. The concentration of the inhibitor component is critical in this respect. If the concentration of the inhibitor is too low, this leads to a significant shortening of the pot life. If it is too high, clear solutions are not formed. It is therefore essential to select the inhibitor concentration so that it amounts to 10 to 20% by weight, preferably 12.5 to 17.5% by weight, in the mixture of components (A), (B) and (C). Various tert.-butyl-substituted phenol derivatives are suitable as inhibitor component (C), such as 2,6-di-t-butylphenol, 2,4,6-tri-t-butylphenol, 2,6-di-t-butyl-4-nonylphenol, 6-t-butyl-2,4-dimethylphenol and 2,6-di-t-butyl-4-methylphenol, wherein the last-mentioned compound is preferably used. In addition, hydroquinone, hydroquinone methyl ester and p-benzoquinone can be used as the inhibitor.

Apart from the provision of peroxide compositions, the present invention relates to the use of these peroxide compositions as starter peroxide compositions in the pultrusion process. In this respect, the concentration of the peroxide composition according to the invention in the resin composition is preferably 0.5 to 1.0% by weight. The peroxide content in the resin composition is most preferably 0.6 to 0.8% by weight, wherein an unsaturated polyester resin, a vinyl ester resin or a low-profile resin is suitable as the basic component of the resin composition.

The starter peroxide formulation according to the invention develops its effect at 50 to 90° C., preferably at 60 to 80° C., and is used particularly advantageously in pultrusion machines, the heated zones of which are adjusted to this temperature range.

In addition to the peroxide composition according to the invention, the resin composition also contains 1 to 2% by weight of one or more peresters or perketals for the completion of the polymerisation and for the reduction of the residual styrene content. Moreover, the resin composition may also contain pigments which are customary for low-profile resins, such as titanium dioxide, fillers such as calcium carbonate and alumina, and release agents. In addition, the low-profile resins may contain thermoplastic additives, such as polyvinyl acetate or poly(methyl methacrylate), for example.

Due to the use of the peroxide composition according to the invention in the pultrusion process, pot lives of 5 to 10 days are achieved; these are thus 2 to 5 times longer than those for bis(4-tert.-butyl-cyclohexyl)-peroxydicarbonate and are up to 20 times longer than those for the methyl isobutyl ketone peroxide formulations of the AKZO-Nobel publication.

The stability on storage (storage temperature) of the composition according to the invention, namely 30° C., is also considerably higher than that of the peroxides or peroxide compositions forming part of the prior art (bis(4-tert.-butyl-cyclohexyl)-peroxydicarbonate: 20° C.; AKZO-Nobel methyl isobutyl ketone formulation: 25° C.).

The present invention is explained in greater detail below with reference to examples of embodiments and comparative experiments.

TABLE 1

| | Composition | | | | Properties of the pultrusion resin composition | |
|---|---|---|---|---|---|---|
| Ex. | Norpol 600-060* (parts by weight) | zinc stearate** (parts by weight) | starter peroxide (parts by weight) | Luperox 231-50 (parts by weight)**** | max. pot life at 23° C. in days | Curing time in sec. |
| 1*** | 100 | 0.5 | Composition according to the invention containing MIKP 0.7 | 1.3 | 6 | 59 |
| Comp. Ex. 1 | 100 | 0.5 | bis(tert.-butyl-cyclohexyl) peroxide dicarbonate 0.5 | 1.5 | 3 | 59 |

| | Mechanical properties of pultruded laminates | | | | Residual styrene |
|---|---|---|---|---|---|
| Composition | Flexural strength in longitudinal direction | Flexural strength in transverse direction | Flexural modulus in longitudinal direction | Flexural modulus in transverse direction | content in % by weight |
| Example 1 | 380 | 190 | 12,000 | 9600 | 0.1 |
| Comparative example 1 | 370 | 180 | 12,000 | 9000 | 0.085 |

MIKP = methyl isobutyl ketone peroxide
*isophthalic "low profile" pultrusion resin
**release agent
***the ratio of 0.7:1.3 was selected for MIKP to Luperox 231-50 in order to take into account the somewhat lower reactivity of MIKP
****Luperox 231-50 = 1,1-bis(tert.-butylperoxy)-3,3,5-trimethylcyclohexane Table 1 contains a summary of the properties of a low-profile pultrusion resin composition, of the mechanical properties of pultruded laminates produced therefrom, and of the residual styrene content in the pultruded laminates. A starter peroxide composition according to the invention, which contained methyl isobutyl ketone peroxide, was used in example 1, whilst bis(tert.-butylcyclohexyl)-peroxydicabonate, which forms part of the prior art, was used in comparative example 1. It can be seen from Table 1 that the mechanical properties of the pultruded laminates, and also the residual styrene content for example 1 and comparative example 1, are comparable, i.e. that pultruded laminates of comparable quality were obtained. An examination of the properties of the pultrusion resin composition before curing shows that the composition from example 1 is considerably superior to that of comparative example 1 as regards pot life, despite an identical curing time. This is due to the fact that the pultrusion resin composition of example 1 contained a starter peroxide composition according to the invention, which enables longer pot lives to be obtained for the pultrusion resin composition.

ing methyl isobutyl ketone peroxide. These compositions can be used in particular where extremely long pot lives are desirable.

The compositions given in comparative examples a contain acetoacetic ester instead of levulinic acid n-butyl ester. For the methyl isobutyl ketone peroxide composition (comparative example 2a), the methyl ethyl ketone peroxide composition (comparative example 4a) and the cyclohexanone peroxide composition (comparative example 5a), it can be seen that on storage at 50° C. a considerable decrease in active oxygen occurred over 5 days. This also applied, but to a considerably lesser extent, to the acetylacetone peroxide composition. These results are due to acetoacetic ester having a considerably higher reactivity towards the corresponding ketone peroxides, which is why it should not be

TABLE 2

| | Composition of the peroxide formulation | | | Properties | |
|---|---|---|---|---|---|
| | Ketone peroxide (a1) (parts component A) | Ketoester (B) (parts) | Inhibitor (C) (parts) | Decrease in active oxygen after 5 days at 50° C. in % | Pot life at a resin temperature of 20° C. in days |
| Ex. | | | | | |
| 2 | MIKP (70) | LSBE (15) | DTBC (15) | 1.8 | 5 |
| 3 | AAP (70) | LSBE (15) | DTBC (15) | 1.7 | 54 |
| 4 | MEKP (70) | LSBE (15) | DTBC (15) | 1.1 | 35 |
| 5 | CHP (70) | LSBE (15) | DTBC (15) | 3.3 | 26 |
| Comp. ex. | | | | | |
| 2a | MIKP (70) | AEE (15) | DTBC (15) | 10.5 | 2 |
| 2b | MIKP (100) | — | — | 1.4 | <1 |
| 3a | AAP (70) | AEE (15) | DTBC (15) | 2.4 | 36 |
| 3b | AAP (100) | — | — | 2.3 | 6 |
| 4a | MEKP (70) | AEE (15) | DTBC (15) | 10.8 | ND |
| 4b | MEKP (100) | — | — | 1.6 | <1 |
| 5a | CHP (70) | AEE (15) | DTBC (15) | 11.8 | 19 |
| 5b | CHP (100) | — | — | 4.6 | <1 |

MIKP = methyl isobutyl ketone peroxide;
AAP = acetylacetone peroxide;
MEKP = methyl ethyl ketone peroxide;
CHP = cyclohexanone peroxide
LSBE = levulinic acid n-butyl ester
DTBC = 2,6-di-tert.-butyl-4-methylphenol (= "di-tert.-butyl-cresol")

In Table 2, examples 2 to 5 according to the invention are compared with two comparative examples with corresponding numbering and designations a and b. Examples 2 to 5 compare different ketone peroxides according to the invention (component (a1) of component (A)) at a constant ratio of parts by weight to levulenic acid n-butyl ester (15% by weight; component (B)) and DTBC (15% by weight; component (C)), dissolved in a highly reactive UP resin (Palatal® P6 supplied by BASF AG) This comparison of the examples according to the invention with each other shows that under the same conditions the compositions which contained acetylacetone peroxide, methyl ethyl ketone peroxide and cyclohexanone peroxide exhibited considerably prolonged pot lives compared with the composition contain-used as a ketoester in corresponding formulations. This emphasises the importance of the choice of a special ketoester as component (B), which according to the invention should not react with component (A).

The comparative examples denoted by b constitute formulations which contain neither component (B) nor component (C). These formulations in fact exhibited no corresponding decrease in active oxygen during storage for 5 days at 50° C., but have considerably shortened pot lives, which do not facilitate a usable processing capacity of the corresponding pultrusion resin compositions. Moreover, it should be remarked that this is the situation even though the amount of peroxide used in comparative examples b was only 0.5% with respect to the highly reactive UP resin (Palatal® P6 supplied by BASF AG), whereas 0.7% of the peroxide was used in the resin composition in the other examples (examples 2–5 and 2a to 5a).

The active oxygen content was determined by the iodometric titration method known to one skilled in the art.

What is claimed is:

1. A peroxide-containing catalyst composition, comprising:
   60 to 80% by weight of a ketone peroxide component (A),
   10 to 20% by weight of a ketone ester component (B) and
   10 to 20% by weight of an inhibitor component (C),
   wherein component (A) behaves in an inert manner in relation to component (B).

2. A peroxide-containing catalyst composition according to claim 1, wherein the proportion of component (A) is between 65 and 75% by weight, the proportion of component (B) is between 12.5 and 17.5% by weight and the proportion of component (C) is between 12.5 and 17.5% by weight.

3. A peroxide-containing catalyst composition according to claim 1, characterised in that component (A) comprises
   a1) 40 to 60% by weight of a monomeric ketone peroxide or of a mixture of monomers and dimers of the ketone peroxide,
   a2) 15 to 45% by weight of a plasticizer,
   a3) 5 to 15% by weight of a ketone,
   a4) 1 to 10% by weight of a β-hydroxyketone,
   a5) 1 to 5% by weight of hydrogen peroxide, and
   a6) 1 to 10% by weight of water.

4. A peroxide-containing catalyst composition according to claim 3, wherein the ketone peroxide of component a1) is methyl isobutyl ketone peroxide, methyl ethyl ketone peroxide, acetylacetone peroxide or cyclohexanone peroxide.

5. A peroxide-containing catalyst composition according to claim 3, wherein the plasticizer a2) is a phthalic acid ester.

6. A peroxide-containing catalyst composition according to claim 1, wherein the ketone ester component (B) is levulinic acid n-butyl ester.

7. A peroxide-containing catalyst composition according to claim 1, when the inhibitor (C) is a tert.-butyl-substituted phenol derivative.

8. A peroxide-containing catalyst composition according to claim 3 wherein the sum of the percentage weights of components a1) to a6) is 100%.

9. A peroxide-containing catalyst composition according to claim 1 or claim 2, wherein the sum of the proportions by weight of components (A), (B) and (C) is 100% by weight.

10. A peroxide-containing catalyst composition, consisting of:
   60 to 80% by weight of a ketone peroxide component (A),
   10 to 20% by weight of a ketone ester component (B) and
   10 to 20% by weight of an inhibitor component (C),
   wherein component (A) behaves in an inert manner in relation to component (B) and the sum of the proportions by weight of components (A), (B) and (C) is 100% by weight.

* * * * *